United States Patent [19]

Ziperovich et al.

[11] Patent Number: 5,493,454
[45] Date of Patent: Feb. 20, 1996

[54] WRITE PRECOMPENSATION OPTIMIZATION IN A PRML CHANNEL USING A SELECTED PRML SIGNAL LEVEL

[75] Inventors: Pablo A. Ziperovich, San Jose; Xiaodong Che, Sunnyvale, both of Calif.

[73] Assignee: Quantum Corporation, Milpitas, Calif.

[21] Appl. No.: 317,902

[22] Filed: Oct. 4, 1994

[51] Int. Cl.⁶ .................................................. G11B 5/09
[52] U.S. Cl. ................................. 360/45; 360/46; 360/53
[58] Field of Search .................................. 360/45, 46, 31, 360/53; 375/290, 348

[56] References Cited

U.S. PATENT DOCUMENTS

| | | | |
|---|---|---|---|
| 5,241,429 | 8/1993 | Holsinger | 360/46 |
| 5,341,249 | 8/1994 | Abbott et al. | 360/46 |

OTHER PUBLICATIONS

Newby et al, "The Effects of Nonlinear Distortion on Class IV Partial Response", *IEEE Trans. on Magnetics* vol. 22, pp. 1203–1205 (1986).
Palmer et al., "Identification of Nonlinear Write Effects Using Pseudorandom Sequences", *IEEE Trans. on Magnetics*, vol. 23, pp. 2377–2379, (1987).
Zperovich, "Performance Degradation of PRML Channels Due to Nonlinear Distortions", *IEEE Trans. on Magnetics*, vol. 27, No. 5, pp. 4825–4827 (1991).

*Primary Examiner*—Aristotelis Psitos
*Assistant Examiner*—W. Chris Kim
*Attorney, Agent, or Firm*—David B. Harrison

[57] ABSTRACT

Write precompensation optimization for a partial response maximum likelihood ("PRML") magnetic recording channel adapted to a mass production environment. Optimal write precompensation may be determined by writing a tribit data pattern known to produce worst case nonlinear transition shift ("NLTS") onto a magnetic recording medium; reading back the recorded data pattern; and calculating the mean-squared error ("MSE") for one or more of the equalized data sample levels associated with the PRML channel to be optimized. The writing and reading back process is repeated with varying amounts of precompensation applied to the written pattern. The optimal amount of write precompensation is determined either by minimizing the MSE for a selected sample level or by minimizing MSE between the middle and the upper or lower of the ternary PRML sample levels.

17 Claims, 8 Drawing Sheets

WRITE PRECOMPENSATION OPTIMIZATION IN A PRML CHANNEL USING A SELECTED PRML SIGNAL LEVEL

FIELD OF THE INVENTION

The present invention pertains to the field of magnetic recording. More specifically, the present invention pertains to a method and apparatus for optimizing the amount of write precompensation applied to a data carrying waveform during a writing process in a magnetic recording system.

BACKGROUND OF THE INVENTION

Write precompensation is a technique associated with the minimization or removal of the effects of nonlinear transition shift ("NLTS") that can occur in high density magnetic recording. Nonlinear transition shift is a write effect caused by magnetostatic interactions that occur between closely spaced magnetic transitions. When adjacent magnetic transitions are recorded closely together NLTS causes a transition that immediately follows a preceding transition to be shifted or drawn toward the preceding transition such that spacing on the media is altered from ideal. When uncorrected, NLTS causes serious degradation of overall recording performance.

An illustration of the effects of NLTS on the write waveform in a magnetic recording channel is given in commonly assigned copending U.S. patent application Ser. No. 08/215,686, filed Mar. 22, 1994, entitled "Apparatus and Method for Evaluating Nonlinearities in a Magnetic Recording Channel Using Pseudo-Random Sequences," the disclosure of which is hereby incorporated by reference in its entirety as if fully set forth herein, and in an article by Newby et al., entitled "The Effects of Nonlinear Distortion on Class IV Partial Response," IEEE Trans. Magn., Vol. 22, 1203–1205 (1986).

As magnetic recording densities become greater and greater write precompensation techniques have become increasingly important to compensate for the detrimental effects of NLTS. Write precompensation involves delaying the times at which adjacently recorded transitions are written onto a magnetic medium so that such adjacent transitions are recorded where intended, i.e., in proper bit spacing on the media relative to a write clocking signal. An example of a write precompensation circuit is disclosed in commonly assigned U.S. Pat. No. 5,341,249 issued Aug. 23, 1994, to Abbott et al., the disclosure of which is hereby incorporated by reference in its entirety as if fully set forth herein.

A write precompensation circuit "looks" at the user data stream as it is written to the disk, and detects the situation where two or more transitions immediately follow each other without intervening bit times. The write precompensation circuit is able to adjust the relative delay (or phase with respect to the write clock) of a transition following a preceding transition in order to carry out precompensation relative to the write clock signal. Application of precompensation delay causes the affected transitions to be time delayed by an appropriate amount, often expressed as a percentage of a nominal bit cell period established by the write clock signal. A write precompensation circuit may have eight programmable percentage delay increments, for example, to implement an appropriate precompensation delay.

Recently, sampled data detection techniques such as Partial Response ("PR") signaling and Maximum Likelihood ("ML") sequence detection (collectively "PRML") have been employed in magnetic recording systems. An example of a PRML data channel architecture is illustrated the above-mentioned U.S. Pat. No. 5,341,249 to Abbott et al. With the recent emergence of PRML systems in magnetic recording, nonlinear transition shift and write compensation therefore has become of particular concern. This is because a PRML recording system is typically modeled as a linear channel that fundamentally requires linear superposition principles to hold between recorded magnetic transitions to achieve optimum performance.

Representative samples of the state of the prior art with regard to the identification and measurement of NLTS in a PRML channel can be found in the aforementioned Newby et al. article and in Palmer et al., "Identification of Nonlinear Write Effects Using Pseudorandom Sequences," IEEE Trans. Magn., Vol. 23, 2377–2279 (1987); Ziperovich, "Performance Degradation of PRML Channels Due to Nonlinear Distortion," IEEE Trans. Magn., Vol. 27, No. 5, 4825–4827 (1991); and in U.S. application Ser. No. 08/215,686. The prior methods developed to measure NLTS outlined in these papers and patent application generally fall either the transform based approach or the correlation based approach. Additionally, spectrum analysis techniques have been used to measure the effects of NLTS.

Palmer et al. provides an example of the transform based approach using a high speed digital oscilloscope and a computer to identify nonlinear write effects. In Palmer et al., a pseudo-random sequence data pattern is written onto a computer disk, read back and captured by a digital oscilloscope. The digitized waveform is then processed in a digital computer through the use of Fourier transforms to obtain a channel transfer function. The inverse transform of the channel transfer function yields a time domain waveform in which various nonlinear effects manifest themselves as echoes, or small perturbations, that appear on either side of a main dipulse. This approach requires the use of expensive equipment and is not suited to a mass production environment because of the involved nature of the testing procedures and computations.

The correlation based approach disclosed in U.S. application Ser. No. 08/215,686 offers a simplified alternative to the transform based approach. In this prior application information regarding nonlinearities similar to that obtained from the Palmer et al. transform based approach may be obtained directly on an oscilloscope, for example, through the use of correlation techniques in the time domain. The amount of NLTS may be measured without the need for frequency domain transformation and manipulation, and without the need to import the digitized waveform into a computer for processing. Using this process, nonlinearities in the write waveform may be determined by writing a predetermined pseudo-random sequence waveform onto a magnetic recording medium, reading back the information and evaluating the autocorrelation of the readback sequence for a predetermined shift, M, where the nonlinearities of interest are known to occur. While the correlation based approach offers the advantages of a simplified test set-up and procedure, it is still not practical to optimize write precompensation for each storage device during manufacture by using the above-described techniques.

The spectrum analysis approach uses a spectrum analyzer and a digital computer to measure the harmonic content of a specific data pattern written and then read back from a magnetic recording medium. Like the transform based approach, expensive equipment is required and application to mass production is not practical.

After the amount of NLTS for a nominal read/write channel is measured using one of these three approaches, an estimated amount (based on the amount of NLTS) of write precompensation is applied to the write waveform and the test repeated to determine the amount of any remaining NLTS. The testing process may then be repeated until an amount of precompensation that minimizes NLTS is found.

While these prior approaches have been able to determine the amount of nonlinear transition shift and, through controlled experimentation, an approximate amount of write precompensation for a nominal read/write channel and head/media combination, individualized write precompensation optimization in a mass production environment has heretofore not been possible. Therefore, a need exists for a method adapted to mass production which is capable of determining a more optimal amount of write precompensation.

Accordingly, it would be desirable to provide a system capable of optimizing write precompensation on an individualized disk drive basis in a mass production environment to take e.g., variations in manufacturing processes and materials into account. It would also be desirable to provide a system capable of taking advantage of existing disk drive hardware and microprocessor capability to optimize write precompensation.

SUMMARY OF THE INVENTION

A general object of the present invention is to provide a write precompensation optimization circuit and related method that overcomes the drawbacks and disadvantages of the prior art by determining a more optimal amount of write precompensation in a PRML recording channel.

Another object of the present invention is to provide a method of optimizing write precompensation wherein an optimal amount of write precompensation is determined for writing data in each of a plurality of different frequency recording zones in a disk drive storage device employing zoned data recording techniques.

A more specific object of the present invention is to provide a write precompensation optimization circuit that includes a multi-purpose mean-squared error ("MSE") function block and a level selector for accumulating equalized sample error values from one of the selected signal levels that define a PRML channel.

Another object of the present invention is to provide a fully integrated write precompensation optimization circuit on board a very large scale integrated circuit chip including disk drive channel electronics.

Another object of the present invention is to provide a recording pattern for use with write precompensation optimization that induces worst case NLTS to adjacently recorded magnetic transitions.

A more specific related object of the present invention is to provide a tribit recording pattern to be used in accordance with write precompensation optimization as disclosed herein.

In accordance with these and other objects, features, and aspects of the present invention, a write precompensation optimization circuit and method of using same are disclosed. The present invention is ideally adapted to a mass production environment in that it enables each disk drive or other magnetic storage device to be individually optimized for write precompensation at the time of manufacture, for example.

In a preferred embodiment, an optimal amount of write precompensation for a PRML magnetic recording channel is determined by applying write precompensation to a predetermined data pattern as it is written onto a magnetic recording medium, reading back the recorded data pattern, and calculating the MSE using integrated circuitry for one or more of the equalized signal levels associated with the PRML channel to be optimized. The writing and reading process is repeated with varying amounts of precompensation applied to the written pattern until the minimum MSE for the selected signal level or levels is obtained.

In a preferred optimization routine, a tribit pattern that results in worst case NLTS to the recorded waveform, and effects mostly middle level samples of the readback waveform is repeatedly written around a recording track on a magnetic recording disk in a disk drive recording system. As used herein, the term "tribit" refers to three consecutive magnetic transitions written adjacent to each other at minimum bit spacing. The periodic tribit pattern is read back from the recording media and sampled by an A/D converter at the PRML channel clock rate.

Equalized sample values from the read channel are transmitted to a MSE function block which preferably has a multi-level quantizer that maps received sample values into the signal levels associated with the PRML channel being optimized. The square (or the absolute value) of the error between the sampled read signal and an expected sample value is fed into an integration block controlled by a level selector which preferably also receives the expected sample values output from the multi-level quantizer. Based on a level selector input, the level selector sends a signal to the integration block to accumulate error values of read signal samples falling within the selected level. In the case of the presently preferred PR4 channel, the minimum MSE value for the middle level, or the minimum difference between the MSE of the middle level and the upper (or lower) levels, indicates minimized NLTS and thus an optimal amount of write precompensation.

In a disk drive having the presently preferred zoned data recording architecture, each recording zone may be individually optimized for write precompensation. Optimized write precompensation values for each recording zone may be stored in memory for retrieval and application to a write precompensation circuit when data is to be written onto the particular zone of the disk during system operation.

These and other aspects, features, objects and advantages of the present invention will be more fully understood and appreciated upon consideration of the following detailed description of a preferred embodiment of the invention, presented in conjunction with the accompanying drawings.

DETAILED DESCRIPTION OF A PREFERRED EMBODIMENT

While the present invention is disclosed in terms of a PR4, ML recording channel in a disk drive data storage system, those skilled in the art will appreciate that the present invention is applicable to other classes of PR channels as well as other forms of digital magnetic recording systems, such as tape drive recording systems, for example.

SYSTEM OVERVIEW

Figure 1:
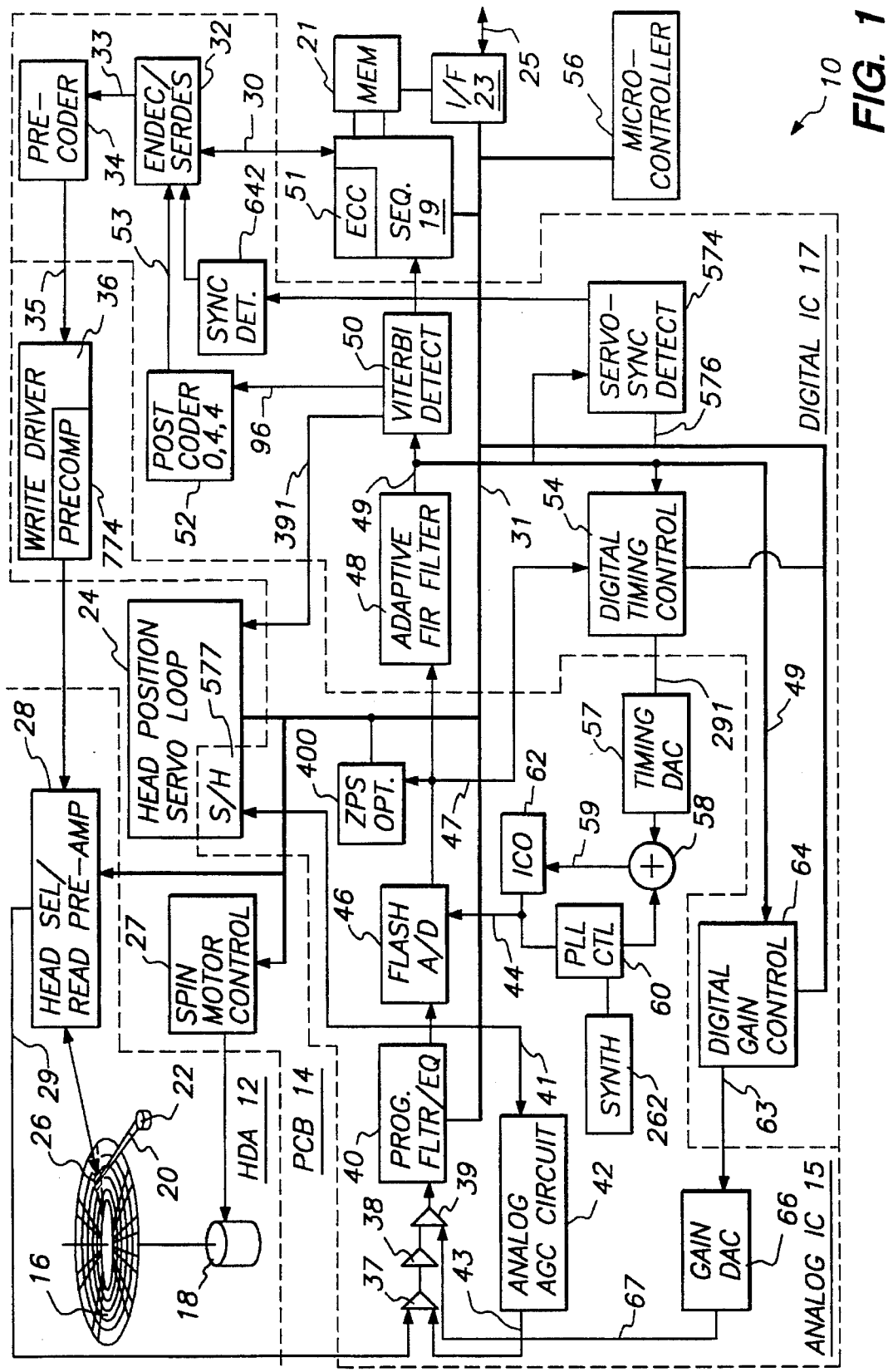
FIG. 1 is a simplified overall system block diagram of a disk drive including a PR4, ML write/read channel architecture.

With reference to FIG. 1, an exemplary high performance, high data capacity, low cost disk drive 10 incorporating a programmable and adaptive PRML write/read channel includes, for example, a head and disk assembly ("HDA") 12, and at least one electronics circuit board ("PCB") 14. The HDA 12 may follow a wide variety of embodiments and sizes. One example of a suitable HDA is disclosed in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Still another HDA arrangement is illustrated in commonly assigned, copending U.S. application Ser. No. 07/881,678, filed on May 12, 1992, and entitled "Hard Disk Drive Architecture", now U.S. Pat. No. 5,396,384. The disclosures of these patents are hereby incorporated by reference in their entirety as if fully set forth herein.

The electronics PCB 14 physically supports and electrically connects the circuitry for an intelligent interface disk drive subsystem, such as the drive 10. The electronics circuitry contained on the PCB 14 includes an analog PRML read/write channel Application-Specific Integrated Circuit ("ASIC") 15, a digital PRML read/write channel ASIC 17, a data sequencer and cache buffer controller 19, a cache buffer memory array 21, a high level interface controller 23 implementing a bus level interface structure, such as SCSI II target, for communications over a bus 25 with a SCSI II host initiator adapter within a host computing machine (not shown). A micro-controller 56 includes a micro-bus control structure 31 for controlling operation of the sequencer 19, interface 23, a servo loop 24, a spindle motor controller 27, a programmable analog filter/equalizer 40, adaptive FIR filter 48, Viterbi detector 50, digital timing control 54, digital gain control 64, a zero phase start optimization circuit 500 as disclosed in copending commonly assigned U.S. application Ser. No. 08/295,505, filed on Aug. 23, 1994 and entitled: "Zero Phase Start Optimization Using Mean Squared Error in a PRML Recording Channel," the disclosure of which is hereby incorporated by reference in its entirety as if fully set forth herein, as well as providing intelligent control to a write precompensation optimization function (to, be described in detail below). The micro-controller 56 is provided with direct access to the DRAM memory 21 via the sequencer/memory controller 19 and may also include onboard and outboard read only program memory ("ROM"), as may be required for the particular application.

The printed circuit board 14 also carries circuitry related to the head positioner servo 24 including e.g., a separate microprogrammed digital signal processor ("DSP") for controlling head position based upon detected actual head position information supplied by a servo peak detection portion of the PRML read channel and desired head position supplied by the micro-controller 56. The spindle motor control circuitry 27 is provided for controlling the disk spindle motor 18 which rotates the disk or disks 16 at a desired angular velocity.

The HDA 12 includes at least one data storage disk 16. The disk 16 is rotated at a predetermined constant angular velocity by a speed-regulated spindle motor 18 controlled by spindle motor control/driver circuitry 27. An in-line data transducer head stack assembly 20 is positioned e.g., by a rotary voice coil actuator 22 which is controlled by the head position servo loop circuitry 24. As is conventional, a data transducer head 26 of the head stack assembly 20 is associated in a "flying" relationship over a disk surface of each disk 16. The head stack assembly 20 thus positions e.g., thin film data transducer heads 26 relative to selected ones of a multiplicity of concentric data storage tracks 71 defined on each storage surface of the rotating disk 16. While thin film heads are presently preferred, improvements in disk drive performance are also realized when other types of heads are employed in the disclosed PRML data channel, such as MiG heads or magneto-resistive heads, for example.

The heads 26 are positioned in unison with each movement of the actuator and head stack assembly 20, and the resulting vertically aligned, circular data track locations are frequently referred to as "cylinders" in the disk drive art. The storage disk may be an aluminum alloy or glass disk which has been e.g., sputter-deposited with a suitable multi-layer magnetic thin film and a protecting carbon overcoat in conventional fashion, for example. Other disks and magnetic media may be employed, including plated media and or spin coated oxide media, as has been conventional in drives having lower data storage capacities and prime costs.

A head select/read channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14. Alternatively, and equally preferably, the preamplifier 28 may be connected to the other circuitry illustrated in FIG. 1 exteriorly of the HDA 12 in an arrangement as described in U.S. application Ser. No. 07/881,678, filed on May 12, 1992, entitled "Hard Disk Drive Architecture."

A bi-directional user data path 30 connects the digital integrated circuit 17 with the data sequencer and memory controller 19. The data path 30 from the sequencer 19 enters an encoder/decoder ("ENDEC") 32 which also functions as a serializer/deserializer ("SERDES"). In this preferred embodiment, the ENDEC 32 converts the binary digital byte stream into coded data sequences in accordance with a predetermined data coding format, such as (0,4,4) code. This coded serial data stream is then delivered over a path 33 to a precoder 34 which precodes the data in accordance with the PR4, precoding algorithm $1/(1 \oplus D^2)$, for example.

Figure 2:
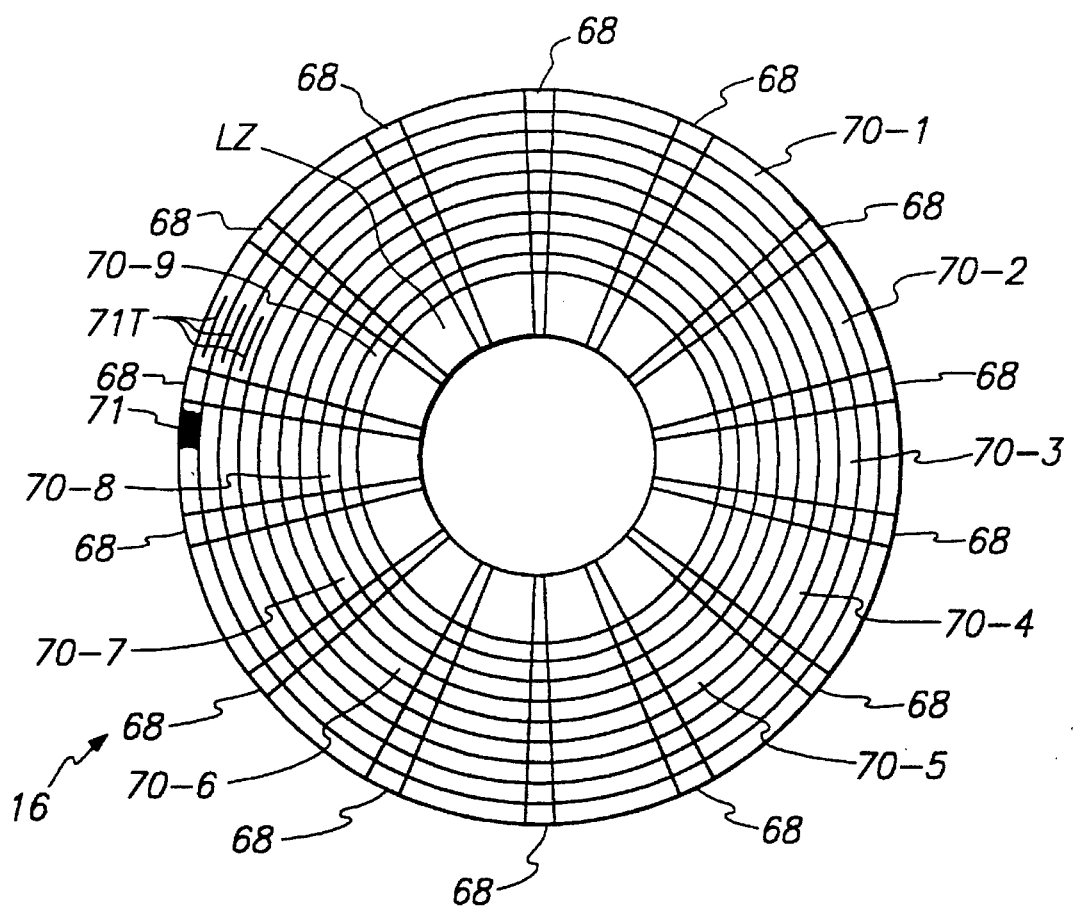
FIG. 2 is a simplified diagram of a recording pattern formed on a data storage surface of the FIG. 1 disk drive, illustrating data zones and embedded servo sector patterns.
Figure 3:
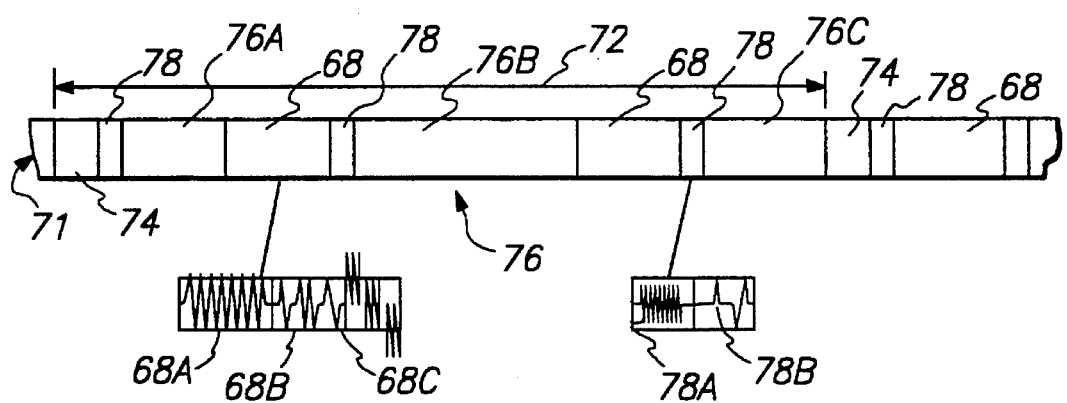
FIG. 3 is an enlarged lineal depiction of a segment of one data track within the multiplicity of data tracks defined within the FIG. 2 data layout plan, illustrating one data field which has been split into segments by regularly occurring embedded servo sectors.

The precoded data is passed over a path 35 to a write driver circuit 36 within the analog IC 15 where it is amplified and precompensated by a write precompensation circuit 774 and is then delivered via a head select function within the circuit 28 to the selected data transducer head 26. The head 26 writes the data as a pattern of alternating flux transitions within a selected data track 71 defined on a selected data storage surface of the disk 16, as shown in FIGS. 2 and 3.

Embedded servo patterns are written by a servo writer, preferably in accordance with the methods described in a commonly assigned U.S. Pat. No. 5,170,299, entitled "Edge Servo For Disk Drive Head Positioner", the disclosure of which is hereby incorporated by reference in its entirety as if fully set forth herein.

Returning now to FIG. 1, during playback, flux transitions sensed by the selected e.g., thin film data transducer head 26 as it flies in close proximity over a selected data track 71 are preamplified by the preamplifier circuit 28. The preamplified analog signal (or "read signal") is sent to the analog IC 15 on a path 29 and into an analog variable gain amplifier ("VGA") 37, a fixed gain amplifier 38, and a second VGA 39. After controlled amplification, the read signal is then passed through a programmable analog filter/equalizer stage 40. During non-read times, an analog automatic gain control circuit 42 feeds an error voltage to a control input of the VGA 37 over a control path 43. During read times, a digital gain control value from a digital gain control circuit 64 is converted into an analog value by a gain DAC 66 and applied over a path to control the second VGA 39, while the analog error voltage on the path 43 is held constant.

The analog filter/equalizer 40 is programmed so that it is optimized for the data transfer rate of the selected data zone 70 from within which the transducer head 26 is reading data. The equalized analog read signal is then subjected to sampling and quantization within a high speed flash analog to digital ("A/D") converter 46 which, when synchronized to user data, generates raw data samples $\{x_k\}$.

The FIR filter 48 employs adaptive filter coefficients for filtering and conditioning the raw data samples $\{x_k\}$ in accordance with the desired PR4 channel response characteristics, in order to produce filtered and conditioned samples $\{y_k\}$. The bandpass filtered and conditioned data samples $\{y_k\}$ leaving the filter 48 are then passed over a path 49 to the Viterbi detector 50 which detects the data stream, based upon the Viterbi maximum likelihood algorithm, for example. At this stage, the decoded data output on a path 96 is in accordance with a (0,6,5) coding convention. A postcoder 52 receives the (0,6,5) coded data stream and restores the original (0,4,4) coding convention to the decoded data. The restored (0,4,4) coded data stream is decoded from the (0,4,4) code and deserialized by the ENDEC/SERDES 32 which frames and outputs eight bit user bytes which then pass into the sequencer 19 over the data path 30.

The raw data samples $\{x_k\}$ are taken on the incoming analog signal waveform at precisely proper, regular locations. A dual mode timing loop is provided to control the frequency and phase of the flash analog to digital converter 46. The timing loop includes an analog timing control circuit 60; and a digital timing control circuit 54 and a timing DAC 57. A timing phase locked synthesizer circuit 262 supplies synthesized timing signals to the control circuit 60 and a timing reference signal to a summing junction 58. A sum output by the summing junction 58 controls the current controlled oscillator 62 in order to clock the A/D converter 46. Zero phase start circuitry 400 is also provided to control the start-up of oscillator 62 at an approximately correct phase with the incoming data samples, in accordance with the referenced copending U.S. patent application Ser. No. 08/295,505.

In order to achieve full utilization of the flash A/D 46, a dual mode gain loop is also provided. The gain loop includes the analog gain control circuit 42 which controls the first VGA 37, and a digital gain control circuit 64 and the gain DAC 66 which controls the second VGA 39.

DATA RECORDING PATTERN

As shown in FIG. 2, an exemplary data storage surface of a storage disk 16 comprises a multiplicity of concentric data tracks 71 which are preferably arranged in a plurality of data recording zones 70 between an inner landing zone area LZ and a radially outermost peripheral data track zone 70-1. In the illustrated example, the data tracks are shown as arranged into nine data zones including the outermost zone 70-1, and radially inward zones 70-2, 70-3, 70-4, 70-5, 70-6, 70-7, 70-8 and 70-9, for example.

In practice, more zones, such as 16 zones, are presently preferred. Each data zone has a bit transfer rate selected to optimize areal transition domain densities for the particular radius of the zone. Since the number of available magnetic storage domains varies directly as a function of disk radius, the tracks of the outermost zone 70-1 will be expected to contain considerably more user data than can be contained in the tracks located at the innermost zone 70-9. The number of data fields, and the data flux change rate will remain the same within each data zone, and will be selected as a function of radial displacement from the axis of rotation of the storage disk 16.

FIG. 2 also depicts a series of radially extending embedded servo sectors 68 which are equally spaced around the circumference of the disk 16, for example. As shown in FIG. 3, each servo sector includes a servo preamble field 68A, a servo identification field 68B and a field 68C of circumferentially staggered, radially offset, constant frequency servo bursts, for example. In addition to data sectors 72 which store user data information and error correction code syndrome remainder values, for example, each data track has certain overhead information such as the FIG. 3 data block header fields 74, and data block ID fields 78.

While the number of data sectors per track varies from data zone to data zone, in the present example, the number of embedded servo sectors 68 per track remains constant throughout the surface area of the disk 16. In this present example, the servo sectors 68 extend radially and are circumferentially equally spaced apart throughout the extent of the storage surface of the disk 16 so that the data transducer head 26 samples the embedded servo sectors 68 while reading any of the concentric tracks defined on the data storage surface.

Also, the information recorded in the servo ID field 68B of each servo sector 68 may be prerecorded with servo writing apparatus at the factory at a predetermined relative low constant frequency, so that the servo information will be reliable at the innermost track location, e.g., within the innermost zone 70-9.

While regular servo sectors are presently preferred, a pattern of servo sectors aligned with data sectors and therefore unique within each data zone 70 is also within the contemplation of the present invention. Such a pattern is illustrated in U.S. Pat. No. 4,016,603, to Ottesen, for example, the disclosure thereof being hereby incorporated by reference. Alternatively, the servo sectors 68 may be recorded at the same data transfer rate as the data rate of each particular zone while maintaining radial alignment of the start of sector, in accordance with the teachings of commonly assigned, copending U.S. patent application Ser. No. 08/174,895 filed on Dec. 23, 1993, entitled: "Sampled Data Channel Servo Detector Using PRML Techniques", now U.S. Pat. No. 5,384,671.

Each data sector is of a predetermined fixed storage capacity or length (e.g., 512 bytes of user data per data sector); and, the density and data rates vary from data zone to data zone. Accordingly, servo sectors 68 may interrupt and split up at least some of the data sectors 72 into segments, such as data segments 76A, 76B and 76C in the present FIG. 3 example. The servo sectors 68 are preferably recorded at a single data cell rate and with phase coherency from track to track with a conventional servo writing apparatus at the factory. A laser servo writer and head arm fixture suitable for use with the servo writer are described in commonly assigned U.S. Pat. No. 4,920,442, the disclosure of which is hereby incorporated herein by reference in its entirety as if fully set forth herein. A presently preferred servo sector pattern is described in the referenced U.S. Pat. No. 5,170,299.

As shown in FIG. 3, a data track 71 includes data blocks or sectors 72 for storage of a predetermined amount of user data such as 512 or 1024 bytes of user data, recorded serially in e.g., (0,4,4) code bits in data field segments 76A, 76B and 76C of the depicted track segment. The data block 72 is shown in FIG. 3 to be interrupted and divided into three segments of unequal length by several servo sectors 68 which contain embedded servo information providing head position information to the disk drive 10. Each data block 72 includes a block ID header field 74 at the beginning of the data block and a data ID header field 78 immediately preceding each data field segment including the segment 76A following ID header 74, and data segments 76B and 76C following interruption by servo sectors 68. The data header ID field 78 may be written at the same time that data is written to the segments 76A, 76B and 76C, and therefore write splice gaps exist just before each data ID header 78, before ID fields, and before servo fields, for example.

In a preferred embodiment, each data ID field 78 may include a preamble field 78A (such as an AGC field) and a sync field 78B. The sync field pattern 78B is preferably provided immediately following the preamble pattern 78A. As more fully explained in U.S. Pat. No. 5,341,249 to Abbott et al., the sync pattern serves as a unique address mark for synchronization of a byte clock to the user data field 76 immediately following the data ID field 78. The byte clock is provided to SERDES 32 which frames user data bytes from the incoming stream of serial bits being read back from disk 16.

WRITE PRECOMPENSATION OPTIMIZATION

Figure 4:
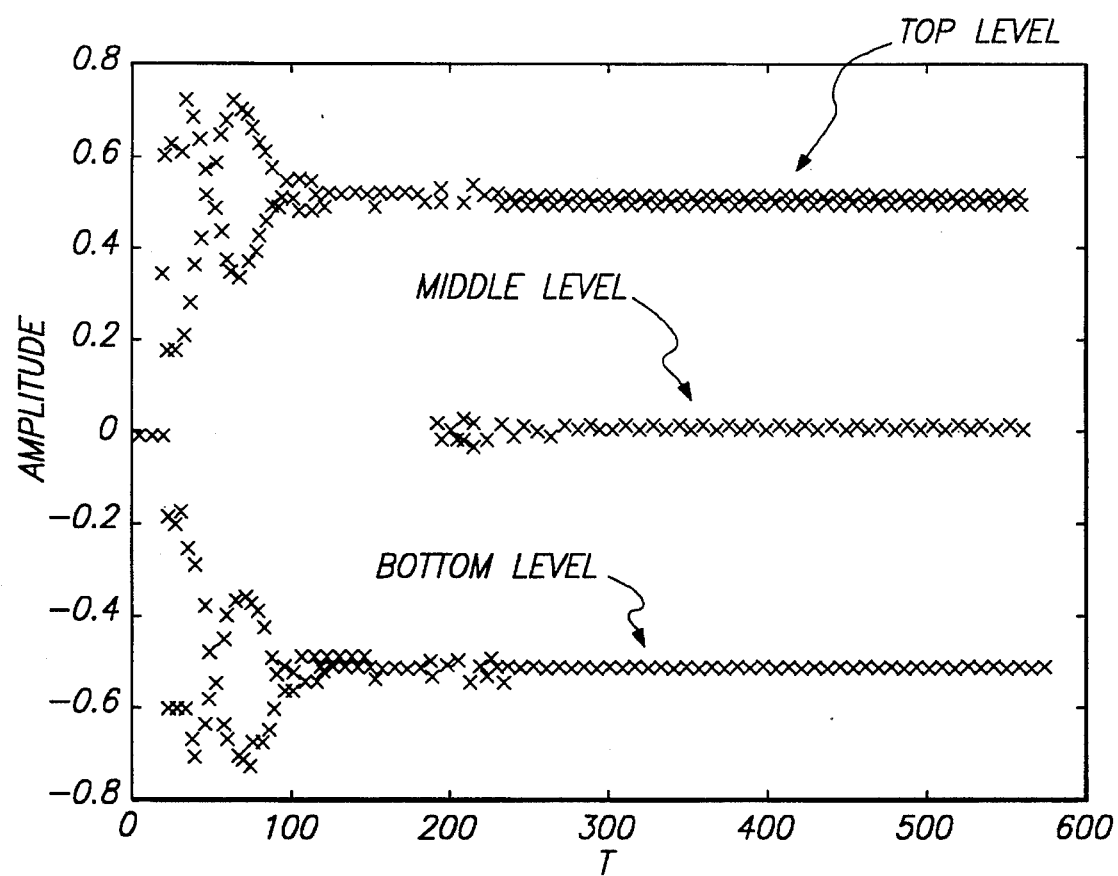
FIG. 4 is a graph of an examplary equalized readback waveform depicting the three distinct levels in a PR4, ML recording channel.

As shown in FIG. 4, the equalized response of a PR4, ML channel is characterized by three distinct signal levels, labeled in FIG. 4 as top, middle and bottom. Data sampled by the read channel ideally fall into one of these three signal levels with any sample deviation resulting in an overall degradation of channel performance. In FIG. 4, the samples prior to approximately bit 100 come from the preamble pattern used to, among other things, lock up the timing loop to an appropriate initial sampling frequency and phase. The preamble waveform only contours the top and bottom levels.

As discussed above, the effects of NLTS in high density recording can cause adjacent transitions i.e., transitions one bit period or T apart, to be shifted from their intended placement on the media.

Mean-squared error ("MSE") has been used as a measure of recording channel quality, since there is a direct correlation between the MSE value of a recovered data stream and the error rate of a PRML recording system. One way of determining MSE is to evaluate MSE over samples taken from all the PRML signal levels. An example of this approach is disclosed in Coker et al., "Magnetic Characterization Using Elements of a PRML Channel," IEEE Trans. Magn., Vol. 27, No. 6, 4544–4548 (1991), wherein the authors discuss the use of PRML channel hardware for enhanced test mechanisms such as disk surface analysis, flying height change detection and error rate performance estimation.

In a preferred embodiment, a modified MSE approach is used in conjunction with a recording pattern that causes the effects of NLTS to be manifested primarily in one of the three PR4, ML signal levels. The modified MSE approach allows MSE values to be calculated on any one of the PRML signal levels independently of the other levels. By selecting a pattern that emphasizes the effects of NLTS in one signal level, an appropriate amount of write precompensation for the channel may be determined by minimizing the MSE of the signal level most affected by NLTS, or by minimizing the difference of the MSE of the middle level and the MSE of the top (or bottom) level.

Figure 6:
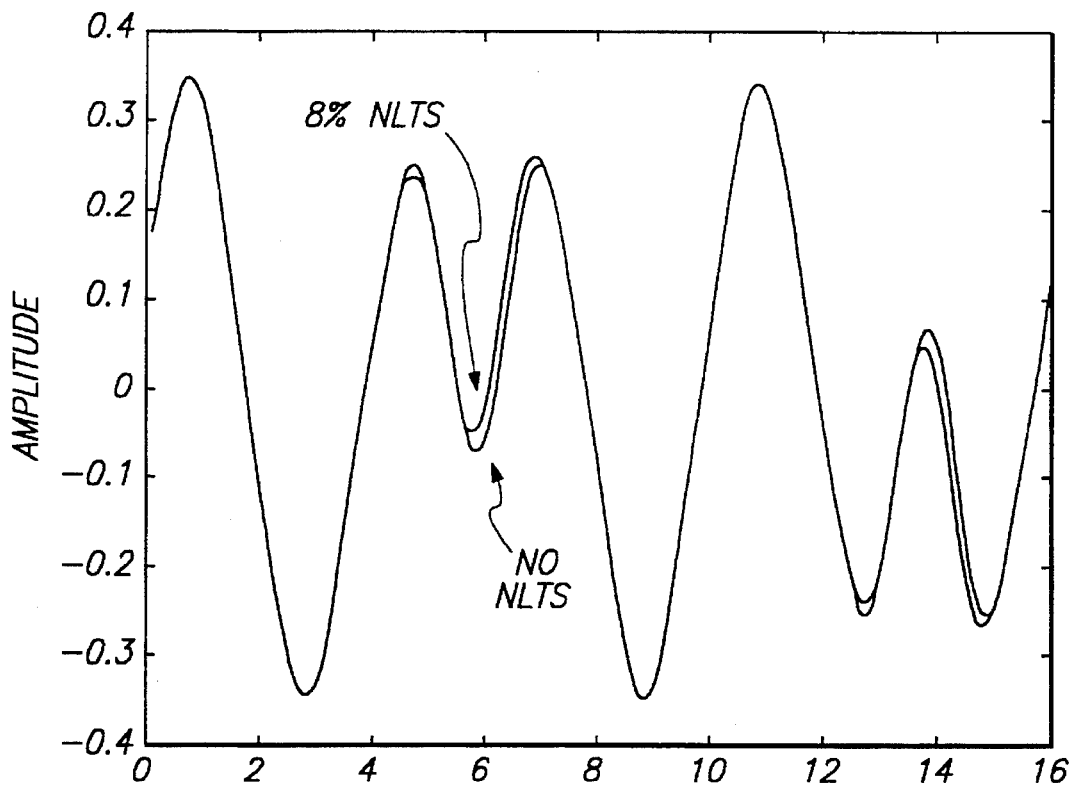
FIG. 6 is a graph of the unequalized Lorentzian channel response to the FIG. 5B recording pattern with and without NLTS wherein the ordinate axis represents signal amplitude and the abscissa axis represents bits.
Figure 7:
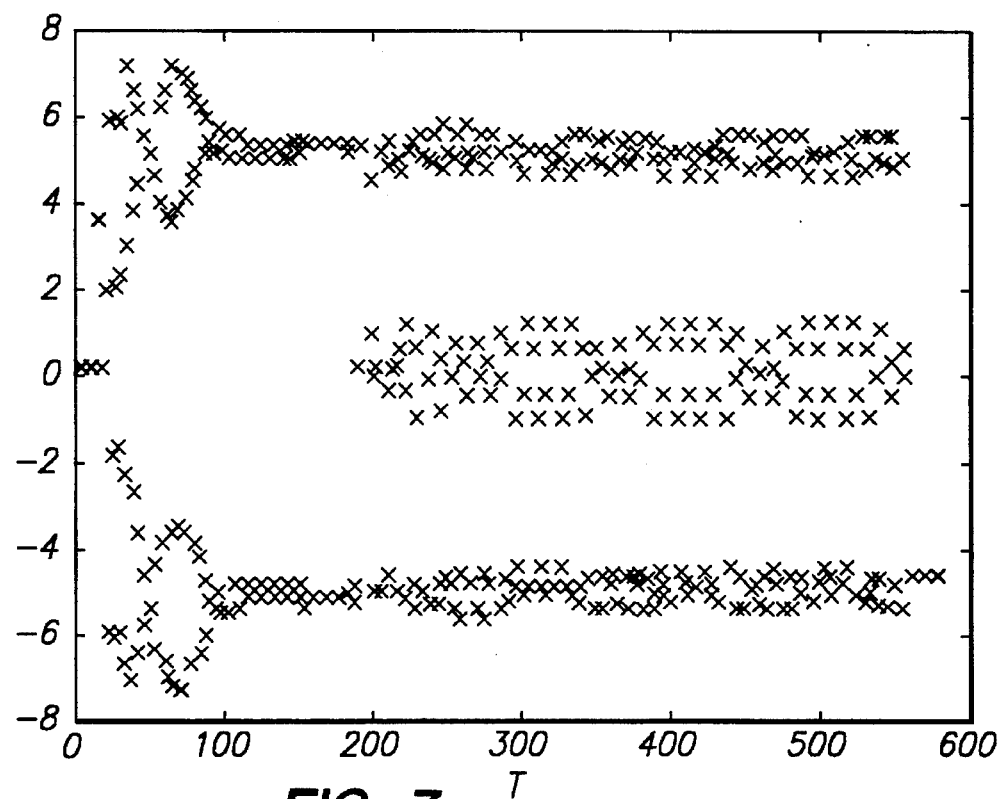
FIG. 7 is an example scatter plot of read signal samples generated from readback of the FIG. 5C data recording pattern showing that with this recording pattern NLTS affects mostly the middle of the three discrete signal levels in a PR4, ML recording system. The plot also shows a preamble pattern, which is not affected by NLTS.

The present inventors have found that a tribit pattern, i.e., three consecutive transitions written without intervening spacing or, in NRZI notation, three consecutive ones (1's), produces worst case NLTS on the middle level of the written waveform. As best seen in FIG. 7, a preferred tribit pattern affects mostly the middle PR4, ML signal level, with minimal effect on the top and bottom levels. Thus, an optimal amount of write precompensation will be an amount that minimizes the middle level effects attributable to the worst case tribit recording pattern. A tribit pattern causes the most profound NLTS effects because the PR4 channel response to this pattern has the greatest waveform slope of any recorded pattern. This maximized slope translates into a maximization of waveform shift when the effects of NLTS are taken into account. FIG. 6 shows an example of the unequalized Lorentzian channel response to the FIG. 5B tribit pattern. The tribit pattern causes, when written to the media, an eight percent shift in the position of the recorded waveform due to NLTS. As is apparent from inspection, the middle sample level of this waveform shows the most dramatic shift due to NLTS.

Figure 5A:
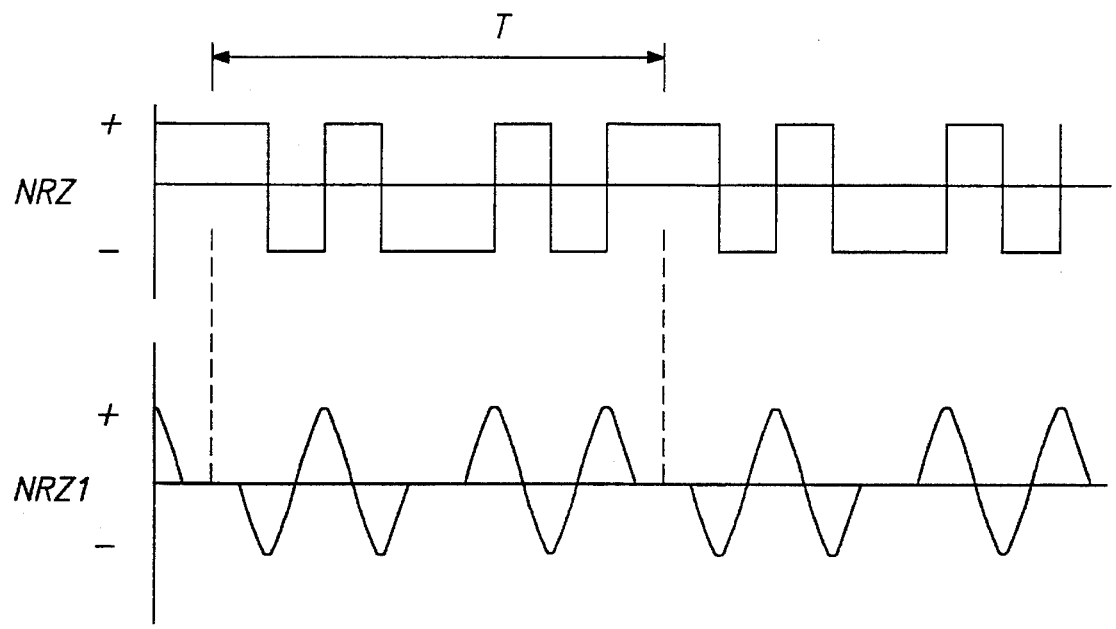
FIGS. 5A, 5B and 5C comprise a series of waveform graphs depicting three different tribit patterns, shown within each figure in both NRZ and NRZI format, that possess the desired properties for use in accordance with write precompensation optimization of the present invention.
Figure 5B:
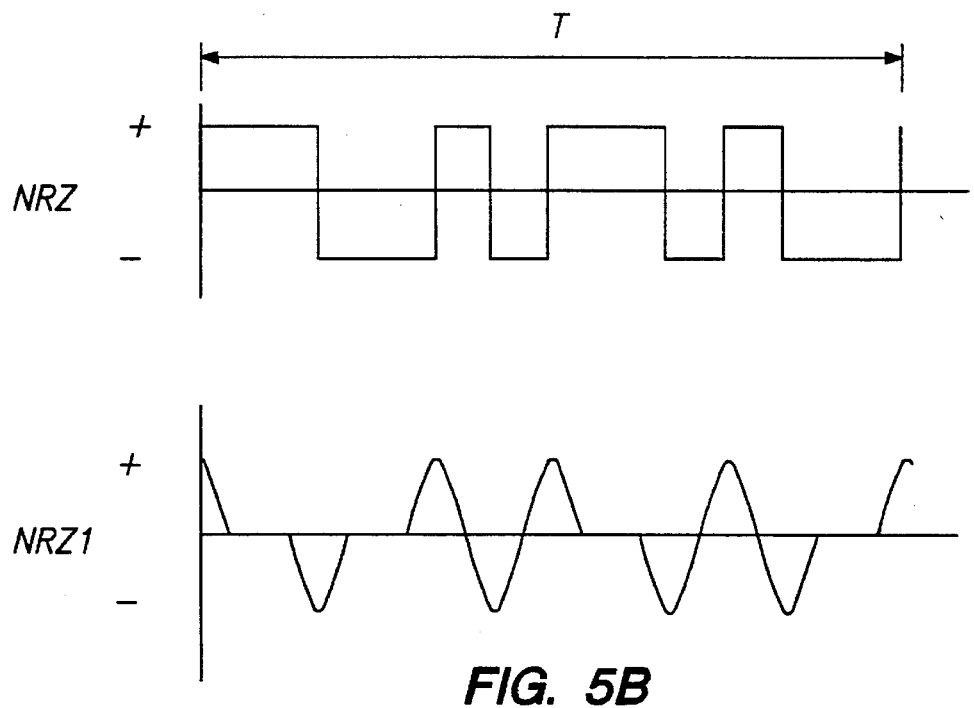
Figure 5C:
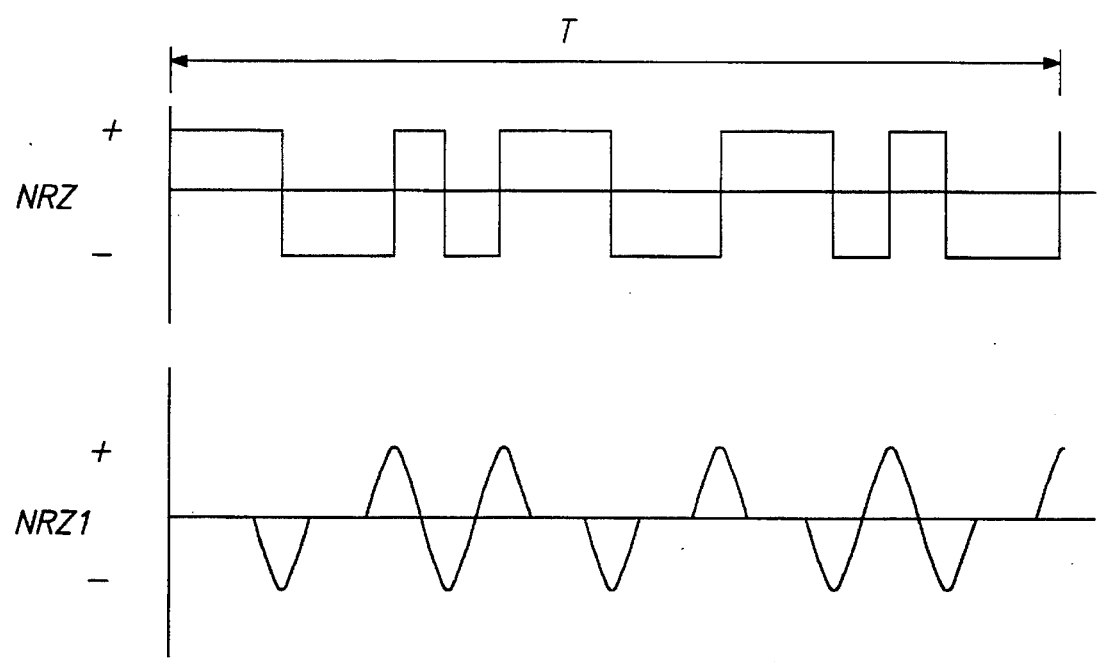

Turning now to FIGS. 5A, 5B and 5C, a series of preferred tribit recording patterns are illustrated that, when recorded on a magnetic medium, result in worst case NLTS of the recorded pattern. The tribit pattern in FIG. 5A consists of a repeating pattern of tribit pairs separated by 2T, or two bit clock cycles, without intervening transitions. The FIG. 5B pattern introduces two isolated transitions occurring outside the tribit pairs into the FIG. 5A pattern, while the FIG. 5C pattern adds two additional isolated transitions between the alternating tribit pairs. It should be noted that this is but a partial list of waveforms that may be constructed from tribit patterns, and it will be apparent to one skilled in the art that numerous other tribit patterns may be conceived that have the desired property of inducing worst case NLTS of the recorded waveform.

Figure 8:
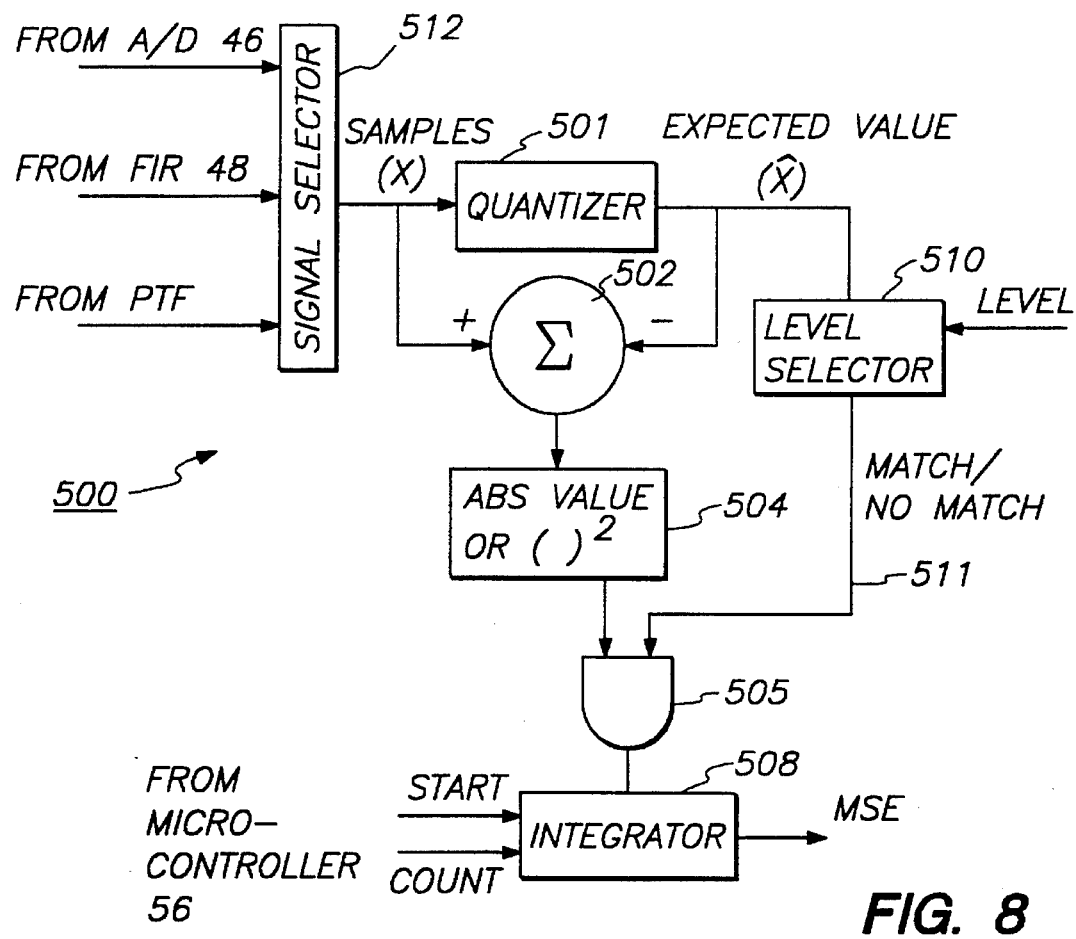
FIG. 8 is a functional block diagram of a multi-purpose MSE function block according to the present invention that is utilized in conjunction with a firmware based precompensation optimization routine.

Turning now to FIG. 8, a preferred multi-purpose MSE circuit 500 has a quantizer 501, a summing junction 502, a function block 504 for obtaining either the absolute value, or, alternatively, the square of an integer value, and an integrator 508. Signal selector 512 provides a user selectable input to the MSE circuit 500. Based on the input to the signal selector 512, the user can measure the MSE of signal samples at various points in the read channel, such as at the output of A/D converter 46, the output of FIR filter 48, or the output of a pole tip filter used to minimize undershoot in the signal response of a thin film head, for example (the pole tip filter is not shown in FIG. 1).

The MSE value at the output of A/D converter 46 may be minimized to optimize the analog filter's 40 cutoff and boost, and in zero phase start optimization as disclosed in the referenced U.S. application Ser. No. 08/295,505. The MSE value at the output of FIR filter 48 gives a measure of the extra performance gained by digital equalization in the FIR filter 48, and can also be used in optimization of the filter 48 coefficients. MSE values taken at the output of the pole-tip filter may likewise be used in optimization of the pole-tip filter coefficients.

In addition to being used to optimize the FIR filter 48 coefficients, the signal at the output of FIR filter 48 may be used to optimize write precompensation in accordance with the teachings herein. As previously discussed, the read signal preferably undergoes both analog and digital equalization (in the FIR filter 48) before being input to detector 50. After digital equalization, the isolated transition response of the read signal should be shaped to meet the desired PR channel characteristics. Taking the signal at the output of FIR filter 48 minimizes misequalization, and, as will be explained below, helps to decouple the effects of misequalization from the measurement of interest. In applications where further signal shaping prior to detection is deemed necessary or desirable, the read signal may be taken at the detector 50 input.

Figure 9:
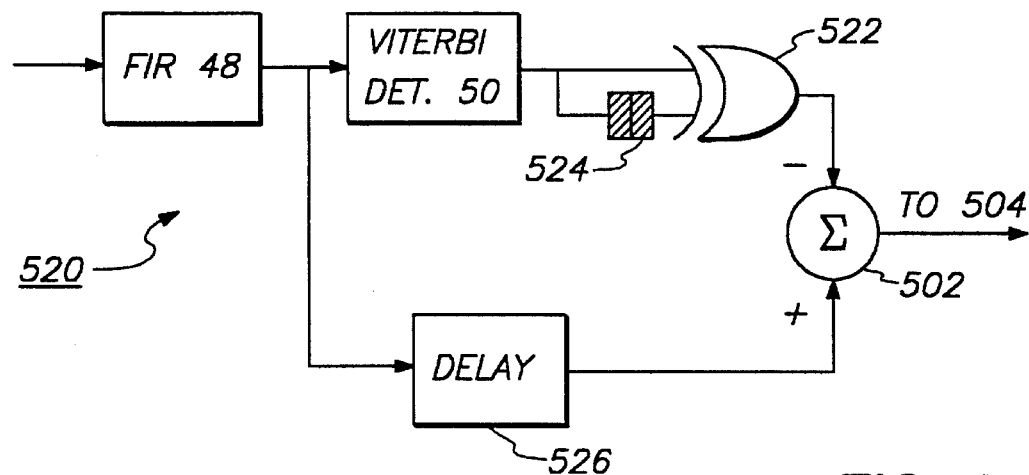
FIG. 9 is a functional block diagram of an alternative MSE function block according to the present invention that is also used in conjunction with a firmware based precompensation optimization routine.

As shown in FIG. 9, the quantizer 501 of the circuit 500 may be eliminated if an output of the Viterbi detector 50 is used in combination with a logic array which restores the $1-D^2$ logical condition present at the input to the Viterbi detector 50. An alternative input circuit 520 includes a suitable logic circuit such as an exclusive-OR gate 522 having one of its inputs connected directly to the output of the Viterbi detector 50 and having another input from the Viterbi detector 50 being first delayed by a two-sample delay circuit 524. A delay circuit 526 is connected to the input of the Viterbi detector 50 and provides a delay to match sample propagation delays through the Viterbi detector 50. The summing circuit 502 then receives and subtracts a value put out by the exclusive-OR gate 522 from a delayed value of the incoming undetected signal stream taken at the input to the Viterbi detector 50. This arrangement employing an output of the Viterbi detector 50 will give better decisions under low signal-to-noise conditions.

Returning to FIG. 8, once selected, the signal at the FIR 48 output (or, detector 50 input, depending on the application) is supplied to quantizer 501, which in the case of PR4, is a three level quantizer with quantization levels that correspond to the expected PR4 signal levels in the channel to be optimized. Quantizer 501 preferably has six bits of resolution and makes threshold decisions on the incoming sample values from the FIR filter 48, mapping the samples into one of three expected levels, such as +1, 0, and −1, in a PR4 channel, for example. As is conventional, a three level quantizer with quantization levels of {1,0,−1} may have its threshold levels set at 0.5 and −0.5 in order to map incoming sample values into the appropriate expected level. In a presently preferred embodiment, the value of the positive and negative thresholds are fixed at 12.5% of the total A/D range (½ the expected sample level), corresponding to the binary values of 001000 and 111000, for the positive and negative thresholds, respectively, (in 2s complement representation).

The output of quantizer 501 is supplied to a negative input of summing junction 502, and the input to quantizer 501 is supplied to a positive input of summing junction 502. Whether the FIG. 8 circuit is employed, or the FIG. 9 circuit is employed, the summing junction 502 subtracts an expected sample value, i.e., {1,0,−1}, from an actual sample value to arrive at a sample error value. These error values are sent to block 504 where either their absolute value or their square is taken. It is simpler, and thus preferable in terms of digital logic requirements, to implement the absolute value function rather than the squaring function. As is well known to those skilled in the art, two's (2's) complement arithmetic may be used to take the absolute value of a negative integer coded as a binary character string by inverting the string and adding 1 to the least significant bit (LSB).

While the absolute value circuit 504 is taking the absolute value (or square), a level selector 510 is controlling an accumulation process within an integrator circuit 508. The circuit 508 accumulates error values from a selected one of the three PR4 signal levels. Level selector 510 also receives the expected sample values output from the quantizer 501 and based on a level select input provided by microcontroller 56 to registers onboard the digital IC 17, for example, sends a match/no match signal via a path 511 to an AND gate 505 at the intput of the integrator circuit 508 that either enables or disables accumulation within the integrator circuit 508. The set of level select inputs is chosen to correspond to the three levels of expected sample values output from quantizer 501 such that a match between the level select input and the incoming expected sample value causes integrator 508 accumulation to occur. Level select inputs may comprise e.g. the set {01,00,11} which is selected to correspond to the top, middle and bottom PR4, ML signal levels, respectively.

When a match between the level select input and expected sample value is found, the level selector may raise its output to a positive logic level and send this signal to a logic circuit, such as AND gate 505, for example, so that the squared (or absolute) error value from the selected signal level is passed to the integrator 508. Actual samples whose expected sample levels do not equal the level select input are discarded at the integrator 508 input.

Integrator circuit 508 may also have an enable signal supplied by micro-controller 56 that controls integrator 508 accumulation of error values from the selected level over a predetermined programmable number of bit clock cycles to determine the MSE value of the selected signal level for the preceding sequence of samples. In a presently preferred implementation, the start of integration can be delayed a minimum of 2 bytes and a maximum of 128 bytes. The length of accumulation within the integrator circuit 508 can be programmed from 16 bytes to 512 bytes.

The MSE value obtained at the expiration of an internal counting mechanism may be stored (along with the selected amount of write precompensation applied to the write waveform for that program iteration) in disk drive on-board memory (21 in FIG. 1), for example, before the integrator 508 is cleared for further iterations of the write precompensation optimization routine. The MSE value obtained from the next write/read operation, or iteration, is compared to the previously stored MSE value and the minimum of the two values is retained. At this time, the memory location storing the write precompensation selection value is also updated with the precompensation selection value corresponding to the retained MSE value. This process may be repeated until the minimum MSE value and corresponding precompensation selection value is obtained.

It is also within contemplation of the present invention to perform a comparison of the top or bottom MSE values with the middle MSE value to determine an optimal amount of write precompensation. In this case, the MSE values for the top or bottom PR4, ML signal levels are obtained in the same manner as the middle MSE value by performing additional reads of the recorded data pattern with the level select input switched to the desired level. The write precompensation value that generates the minimum difference between the MSE of the middle level and the top or bottom level is considered optimal for this procedure. This multi-level comparison is useful to decouple the effects of any misequalization from the MSE minimization process.

In practice, a firmware function call may be initiated after manufacture, during individualized drive testing, for example, to cause the disk drive to begin write precompensation optimization. In a preferred embodiment, the routine begins by causing a preferred tribit recording pattern to be repeatedly written around a recording track of a magnetic recording disk. For this initial writing process some programmable initial amount of write precompensation is selected via the write precompensation circuit's programmable percentage delay increments, for example, to implement an appropriate initial precompensation delay based on the expected performance of the read/write channel for the head/media combination employed.

The preferred tribit pattern is then read back from the recording surface of the disk and sampled by the read channel flash A/D converter 46. At the beginning of every recorded data segment, including the beginning of the tribit data pattern segments recorded during optimization as taught herein, a unique pattern, such as the sync field pattern described with reference to FIG. 3 is recorded on the disk to inform the read channel electronics that user data is to be received. When pattern recognition electronics in the read channel detect the sync pattern, for example, a signal such as "address mark found" may be asserted to enable, in any conventional fashion, the memory circuits in integrator 508 to begin MSE accumulation. Preferably, the delay is programmed from the time the sync byte is found. As previously discussed, integrator 508 accumulation is preferably programmable and may be delayed for an amount of time appropriate for the application.

After accumulation of the error values coming within the middle sample level, (or the middle and top or bottom levels in the multiple read embodiment discussed above) the resulting MSE value is stored, and the process of writing, reading, and accumulating, to determine the MSE of a selected level may be repeated with a different amount of write precompensation applied to the written tribit pattern. Increases, (or decreases, depending on the application), in write precompensation may be made in several step increments, according to the coarseness of the available write precompensation adjustment, until an amount of precompensation that causes the MSE value for the middle signal level to be minimized is found. This optimal write precompensation value may be stored in memory 21 for retrieval and application to the write precompensation circuitry as discussed above during disk drive operations in the associated data zone.

Figure 10:
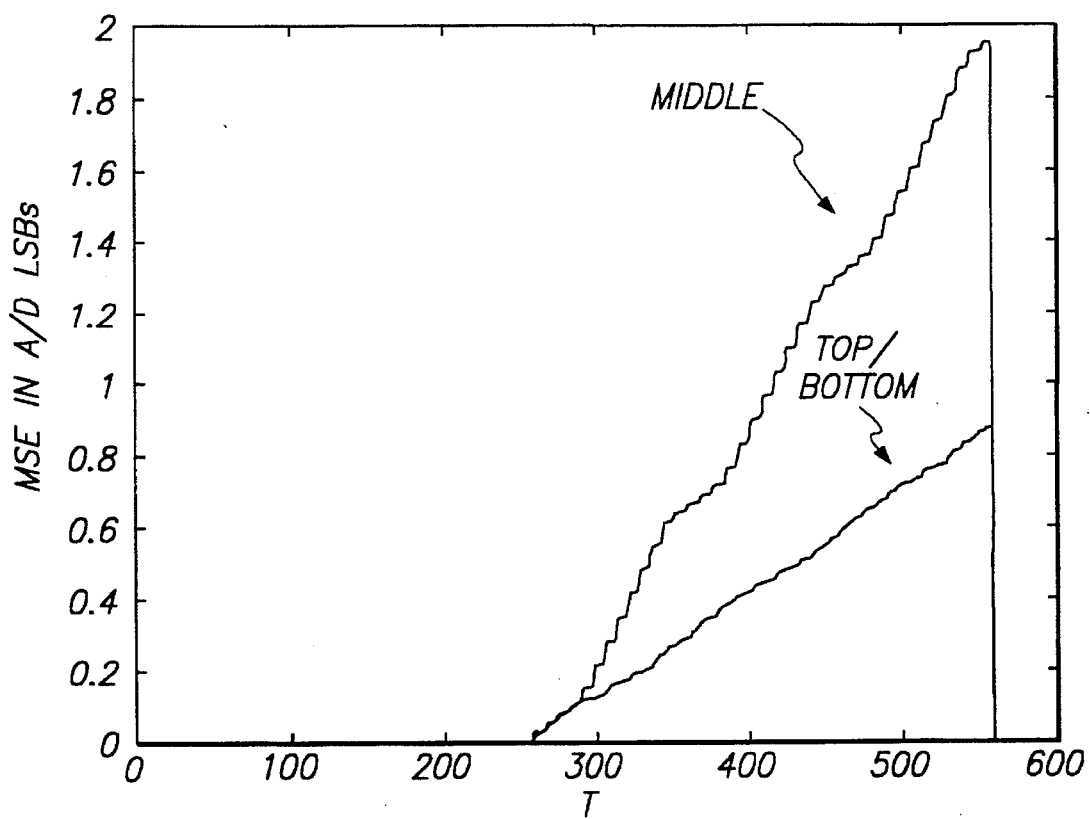
FIG. 10 is a plot of the results of an exemplary MSE measurement according to the present invention that shows accumulation of MSE for the middle and top (or bottom) signal levels generated during readback of the FIG. 5C data recording pattern.

FIG. 10 shows the accumulation of MSE over an exemplary measurement for the middle and the top (or bottom) levels, based on the FIG. 5C tribit pattern. As shown in the figure, the final MSE value for the middle level is approximately twice that for the top (or bottom) level. As write precompensation is optimized the final value of the MSE for all the levels should be approximately the same.

It should be noted that in the presently preferred zoned data recording architecture, each data zone may be individually optimized for write precompensation by repeating the above process within each zone. The optimal precompensation values determined for each zone may be stored in memory 21 where they can be accessed and applied to the write precompensation circuit when data is to be written into a particular recording zone.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method of optimizing write precompensation in a PRML magnetic recording channel comprising the steps of:

(a) applying a value of write precompensation to a predetermined data pattern thereby creating a precompensated data pattern;

(b) writing said precompensated data pattern onto a magnetic recording medium;

(c) reading said precompensated data pattern from said magnetic recording medium and generating therefrom a read signal;

(d) inputing said read signal into said PRML channel, said PRML channel having an output providing a plurality of PRML signal levels;

(e) sampling said read signal to obtain a series of read signal samples;

(f) selecting one of said plurality of PRML signal levels;

(g) calculating a mean-squared error value of read signal samples from said selected one of said PRML signal levels; and (h) repeating said steps of applying, writing, reading, inputing, sampling and calculating for said selected PRML signal level using a new value of write precompensation for each repetition until a minimum mean-squared error value of read signal samples from said selected PRML signal level is obtained.

2. The method of claim 1 wherein said PRML magnetic recording channel comprises a class IV partial response channel characterized by the polynomial $1-D^2$.

3. The method of claim 1 wherein said magnetic recording medium is a rigid disk in a disk drive storage device.

4. The method of claim 1 wherein said predetermined data pattern is written around a recording track of a magnetic recording disk in a disk drive storage system.

5. The method of claim 4 wherein said predetermined data pattern comprises a tribit pattern.

6. The method of claim 5 wherein said PRML magnetic recording channel comprises a class IV partial response channel having an output providing top, middle and bottom signal levels and wherein said selected PRML signal level is said middle signal level.

7. The method of claim 1 wherein said predetermined data pattern comprises a repeating tribit pattern.

8. The method of claim 7 wherein said PRML magnetic recording channel comprises a class IV partial response channel having an output providing top, middle and bottom signal levels and wherein said selected PRML signal level is said middle signal level.

9. The method of claim 1 further comprising the step of storing a value corresponding to said value of write precompensation that yielded said minimum mean-squared error value.

10. The method of claim 9 further comprising the step of using said stored value to select an amount of write precompensation to apply to any data pattern written onto said magnetic recording medium.

11. The method of claim 1 wherein said step of calculating said mean-squared error value comprises the steps of:

(a) generating a series of read signal error values by subtracting expected sample values from said read signal samples;

(b) taking the absolute value of said series of error values; and (c) integrating the absolute value of said series of error values from said selected PRML signal level.

12. The method of claim 1 wherein said step of calculating said mean-squared error value comprises the steps of:

(a) generating a series of read signal error values by subtracting expected sample values from said read signal samples;

(b) squaring said series of error values; and (c) integrating the square of said series of error values from said selected PRML signal level.

13. The method of claim 1 wherein said method is performed in each of a plurality of different frequency recording zones in a zoned recording disk drive storage system and further comprising the steps of saving a minimum mean-squared error value for each zone, selecting a particular zone for a data writing operation, and retrieving and applying a saved mean-squared error value for each selected zone thereby optimizing write precompensation for said selected recording zone before writing data to tracks located within the zone.

14. The method of claim 13 further comprising the steps of storing a series of write precompensation selection values corresponding to the amount of write precompensation that generated minimum mean-squared error during optimization of each of said recording zones; and using one of said stored write precompensation selection values to select an optimal amount of write precompensation when any data pattern is to be written to a selected one of said recording zones.

15. A method of optimizing write precompensation in a PRML magnetic recording channel comprising the steps of:

(a) applying a value of write precompensation to a predetermined data pattern thereby creating a precompensated data pattern;

(b) writing said precompensated data pattern onto a magnetic recording medium;

(c) reading said precompensated data pattern from said magnetic recording medium and generating therefrom a read signal;

(d) inputing said read signal into said PRML channel, said PRML channel having an output providing a plurality of PRML signal levels;

(e) sampling said read signal to obtain a series of read signal samples;

(f) selecting a first of said plurality of PRML signal levels;

(g) calculating a mean-squared error value of said read signal samples from said first selected PRML signal level;

(h) selecting a second of said plurality of PRML signal levels;

(i) repeating said steps of reading, inputing, sampling, and calculating to obtain a mean-squared error value of said read signal samples from said second selected PRML signal level; and (j) repeating said steps of applying, writing, reading, inputing, sampling and calculating a mean-squared error value of said read signal samples from said first selected PRML signal level, and said steps of reading, inputing, sampling and calculating a mean-squared error value of read signal samples from said second selected PRML signal level using a new value of write precompensation for each repetition until a difference between said mean-squared error value of read signal samples from said first selected PRML signal level and said mean-squared error value of read signal samples from said second PRML signal level is minimized.

16. The method of claim 15 wherein said predetermined data pattern comprises a repeating tribit pattern and said magnetic recording medium comprises a magnetic recording disk having a multiplicity of concentrically displaced recording tracks in a disk drive storage system, said repeating tribit pattern written on at least one of said multiplicity of recording tracks.

17. The method of claim 16 wherein said PRML magnetic recording channel comprises a class IV partial response channel having an output providing top, middle and bottom signal levels and wherein said first selected PRML signal level is said middle level and said second selected PRML signal level is either said top or said bottom signal level.

* * * * *